United States Patent
Nakagawa et al.

(10) Patent No.: US 8,172,157 B2
(45) Date of Patent: May 8, 2012

(54) COGENERATION APPARATUS

(75) Inventors: Yoshinori Nakagawa, Wako (JP); Akihito Kasai, Wako (JP); Tsutomu Wakitani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1058 days.

(21) Appl. No.: 11/662,210

(22) PCT Filed: Aug. 30, 2005

(86) PCT No.: PCT/JP2005/015717
§ 371 (c)(1),
(2), (4) Date: Mar. 8, 2007

(87) PCT Pub. No.: WO2006/030629
PCT Pub. Date: Mar. 23, 2006

(65) Prior Publication Data
US 2008/0061158 A1    Mar. 13, 2008

(30) Foreign Application Priority Data

Sep. 14, 2004 (JP) .................... 2004-266777

(51) Int. Cl.
*F02G 5/04* (2006.01)
*F02G 5/00* (2006.01)
(52) U.S. Cl. ........ 237/12.1; 237/2 A; 237/2 R; 237/8 A; 60/614; 60/320
(58) Field of Classification Search ................... 237/2 A, 237/2 R, 8 A, 12.1; 60/614–624, 320; 122/3; F02G 5/04, 5/00
See application file for complete search history.

(56) References Cited

U.S. PATENT DOCUMENTS
4,339,307 A * 7/1982 Ellis, Jr. ................... 202/176
(Continued)

FOREIGN PATENT DOCUMENTS
EP    1045127 A2 * 10/2000
(Continued)

OTHER PUBLICATIONS
Translation—JPA-2001123886.pdf; PTO 11-0991; Dec. 2010; Schreiber Translations, Inc.*
(Continued)

*Primary Examiner* — Steven B McAllister
*Assistant Examiner* — Daniel E Namay
(74) *Attorney, Agent, or Firm* — Westerman, Hattori, Daniels & Adrian, LLP

(57) ABSTRACT

A thermal demand priority type cogeneration system, is made operative for obtaining power output without thermal demand. When the temperature in a hot water tank 17 is low, a heat request is output from a heat request generator 42 and thereby an engine 11 is driven. When the temperature T higher than a predetermined temperature T1, a first water supply instructing unit 44 opens a valve 39 and supplies water to the tank 17 to decrease the water temperature T. When the water temperature goes down, thermal demand is generated, the engine 11 is driven according to the heat request. So as to generate thermal demand, a discharge valve 41 may be opened when the water temperature T is at the predetermined temperature or higher. A second water supply instructing unit 46 opens the valve 39 when reserved water level in the tank 17 goes down. When the valve 39 is opened, water is supplied and the water temperature goes down and thermal demand is generated. At a power failure of a commercial electric power system 14, thermal demand is generated forcibly.

4 Claims, 4 Drawing Sheets

U.S. PATENT DOCUMENTS

| | | | |
|---|---|---|---|
| 4,441,902 A * | 4/1984 | Jardine | 62/238.6 |
| 4,584,987 A * | 4/1986 | Rotili | 126/514 |
| 4,687,550 A * | 8/1987 | Wong | 202/165 |
| 4,715,192 A * | 12/1987 | Katz | 62/323.1 |
| 4,857,755 A * | 8/1989 | Comstock | 307/47 |
| 4,861,435 A * | 8/1989 | Sweet, Jr. | 202/180 |
| 4,906,337 A * | 3/1990 | Palmer | 202/160 |
| 5,392,741 A * | 2/1995 | Uzkan | 123/41.13 |
| 5,517,822 A * | 5/1996 | Haws et al. | 60/618 |
| 5,607,013 A * | 3/1997 | Inoue et al. | 165/207 |
| 5,617,504 A * | 4/1997 | Sciacca et al. | 392/307 |
| 6,006,706 A * | 12/1999 | Kanzaki | 123/90.15 |
| 6,053,418 A * | 4/2000 | Guyer | 237/12.1 |
| 6,073,857 A * | 6/2000 | Gordon et al. | 237/12.1 |
| 6,161,768 A * | 12/2000 | Gordon et al. | 237/12.1 |
| 6,234,400 B1 * | 5/2001 | Guyer | 237/12.1 |
| 6,240,718 B1 * | 6/2001 | Fetescu | 60/784 |
| 6,290,142 B1 * | 9/2001 | Togawa et al. | 237/12.1 |
| 6,324,849 B1 * | 12/2001 | Togawa et al. | 60/616 |
| 6,325,026 B1 * | 12/2001 | Suzuki | 123/41.1 |
| 6,435,420 B1 * | 8/2002 | Kasai et al. | 237/12.1 |
| 6,874,694 B2 * | 4/2005 | Saitoh et al. | 237/2 B |
| 7,663,256 B2 * | 2/2010 | Yuri et al. | 290/2 |
| 2001/0049933 A1 * | 12/2001 | Iwamoto et al. | 60/39.07 |
| 2002/0108745 A1 * | 8/2002 | Kimura | 165/236 |
| 2004/0124638 A1 * | 7/2004 | van de Loo | 290/40 C |
| 2004/0211845 A1 * | 10/2004 | Chain et al. | 237/2 R |
| 2006/0191265 A1 * | 8/2006 | Kang et al. | 60/659 |
| 2008/0022707 A1 * | 1/2008 | Cho et al. | 62/238.1 |
| 2008/0022708 A1 * | 1/2008 | Cho et al. | 62/238.7 |
| 2008/0061158 A1 * | 3/2008 | Nakagawa et al. | 237/12.1 |

FOREIGN PATENT DOCUMENTS

| | | | |
|---|---|---|---|
| JP | 4-10302 B2 | | 2/1992 |
| JP | 10-9054 A | | 1/1998 |
| JP | 2000-87801 A | | 3/2000 |
| JP | 2000-297963 A | | 10/2000 |
| JP | 2001-123886 | * | 5/2001 |
| JP | 2001-123886 A | | 5/2001 |
| JP | 2002-70606 A | | 3/2002 |
| JP | 2002-267263 A | | 9/2002 |
| JP | 2003-120211 A | | 4/2003 |
| JP | 2004-236422 A | | 8/2004 |
| JP | 2009103418 A | * | 5/2009 |

OTHER PUBLICATIONS

Notification of Transmittal of Translation of the International Preliminary Report on Patentability (Form PCT/IB/338) of International Application No. PCT/JP2005/015717 mailed Mar. 29, 2007 with Form PCT/IB/373 and Form PCT/ISA/237.

* cited by examiner

COGENERATION APPARATUS

TECHNICAL FIELD

The present invention relates to a cogeneration apparatus which performs electric power generation and hot-water supply by using an engine as a power source such as a gas engine using city gas as fuel and, more particularly, to a heat-demand type cogeneration apparatus which generates electric power in demand of heat.

BACKGROUND ART

In recent years, necessity of global environment conservation is noised abroad, and a cogeneration apparatus serving as a privately-owned electrical power facility which performs electric power generation, hot-water supply, and the like by using an engine such as a gas engine using city gas or the like as fuel as a power source attracts attention. In the cogeneration apparatus of this type, a heat output generated by electric power generation cannot be simultaneously consumed in many cases. From the viewpoint that energy is used without waste, a heat-demand-priority type apparatus which does not generate an amount of heat which cannot be consumed is proposed. For example, a cogeneration apparatus described in Japanese Patent Application Laid-open No. 2000-87801 is operated only when heat request is occurred from a heat load side to improve operating efficiency. In Japanese Patent Application Laid-open No. 2000-297963, a heat-demand-priority type apparatus which further includes a hot-water supply tank as a buffer for heat output and heat demand and which temporarily stores an amount of heat as hot water in the hot-water supply tank when the heat output and the heat demand are not equal to each other. According to this apparatus, an amount of heat can be used through hot water depending on heat demand in order to make it possible to reduce waste when the cogeneration apparatus does not operate.
Patent Document 1: JP 2000-087801 A
Patent Document 2: JP 2000-297963 A

DISCLOSURE OF THE INVENTION

Problem to be Solved by the Invention

Since the conventional cogeneration apparatuses described in the above Patent Documents are of heat-demand-priority type (heat-demand take priority of electricity-demand), the operation cannot be operated without heat demand. Therefore, an electric generation output cannot be obtained. More specifically, even though an electric power is necessary in an emergency situation such as electricity failure, the apparatus cannot be operated without heat demand. Therefore, for example, it is inconvenient that a compact cogeneration apparatus which can also be installed in a house, that is, an electrical power facility which is consciously owned by a user cannot be used immediately in an emergency state such as electricity failure.

The present invention has been made to eliminate the above disadvantage, and has as its object to provide a heat-demand-priority type cogeneration apparatus which can obtain an electric power output as a special measure in an emergency state such as electricity failure without heat demand.

Means for Solving the Problem

As a first characteristic feature of the present invention, a cogeneration apparatus includes a heat exchanger which heats water stored in a hot-water storage tank with exhaust heat collected from an engine of an engine driven electric-power generator, and a controller that enables to operate the engine when a temperature of water in the hot-water tank is equal to or less than a predetermined temperature, further includes a means which lowers the temperature of water in the hot-water tank when the water temperature is equal to or more than the predetermined temperature.

As a second characteristic feature of the present invention, the temperature of water in the hot-water tank is lowered by supplying water into the hot-water tank when the water temperature in the hot-water tank is equal to or more than the predetermined temperature.

As a third characteristic feature of the present invention, the cogeneration apparatus further includes water supply means which supplies water into the hot-water tank when a level of water in the hot-water tank is equal to or less than a set level, and the means which lowers the temperature of water in the hot-water tank lowers the water level at equal to or less than the set level by discharging water from the hot-water tank.

As a fourth characteristic feature of the present invention, an electric generation output from the electric generator is engaged with a power system, and the means which lowers the water temperature is designed to be operated in electricity failure in the power system.

As a fifth characteristic feature of the present invention, the cogeneration apparatus includes switch means which disengages the electric generator from the power system in electricity failure in the power system.

Effect of the Invention

In the present invention having the first characteristic feature, in the heat-demand-priority type cogeneration apparatus which has the engine electric generator driven when the temperature of water in the hot-water tank serving as a heat load is equal to or less than the predetermined water temperature, that is to say, when heat demand is caused, the temperature of the water in the hot-water tank is lowered to equal to or less than the predetermined water temperature when there is no heat demand. In this manner, the engine-driven electric power generator of the cogeneration apparatus can be made driven as a special measure in an emergency state while using a heat-demand-priority type operating system without any change.

According to the second characteristic feature, by using the water supply means to the hot-water tank, low-temperature water such as tap water is supplied from the outside to decrease the heat temperature so as to make it possible to cause heat demand. Therefore, even though the operating system is of the heat-demand-priority type, the operating system can cope with an operation in an emergency state by simple control of a water circuit.

According to the third characteristic feature, by using the control means which supplies water when the water level in the hot-water tank decreases to the set water level, water is discharged from the hot-water tank when the water temperature is equal to or less than the predetermined water temperature. In this manner, the water level decreases to supply low-temperature water such as tap water from the outside, and the water temperature is consequently decreased to equal to or less than the set water temperature to make it possible to cause heat demand. Therefore, the same effect as that in the second characteristic feature is exerted. Furthermore, the invention having the third characteristic feature is effective when the hot-water tank is so small that further water supply which is enough to sufficiently decrease the water temperature is difficult.

According to the fourth characteristic feature, when electricity failure occurs in the power system, the water temperature in the hot-water tank is decreased to make it possible to automatically drive the engine electric generator. According to the fifth characteristic feature, since the electric generator is disconnected from the system in electricity failure, the engine-driven power electric generator can be operated as an emergency electric generation apparatus without influencing the power system.

DESCRIPTION OF REFERENCE NUMERALS

10 . . . engine-driven electric power generator unit, 11 . . . engine, 12 . . . electric generator, 13 . . . electric power converter, 14 . . . commercial electric power system, 17 . . . hot-water tank, 20 . . . first heat exchanger, 21 . . . hot-water supplier, 22 . . . second heat exchanger, 24 . . . heating apparatus, 29 . . . controller, 36 . . . water-temperature sensor, 37 . . . water-level sensor, 39 . . . water-supply valve, 41 . . . water-discharge valve

BEST MODE FOR CARRYING OUT THE INVENTION

Figure 2:
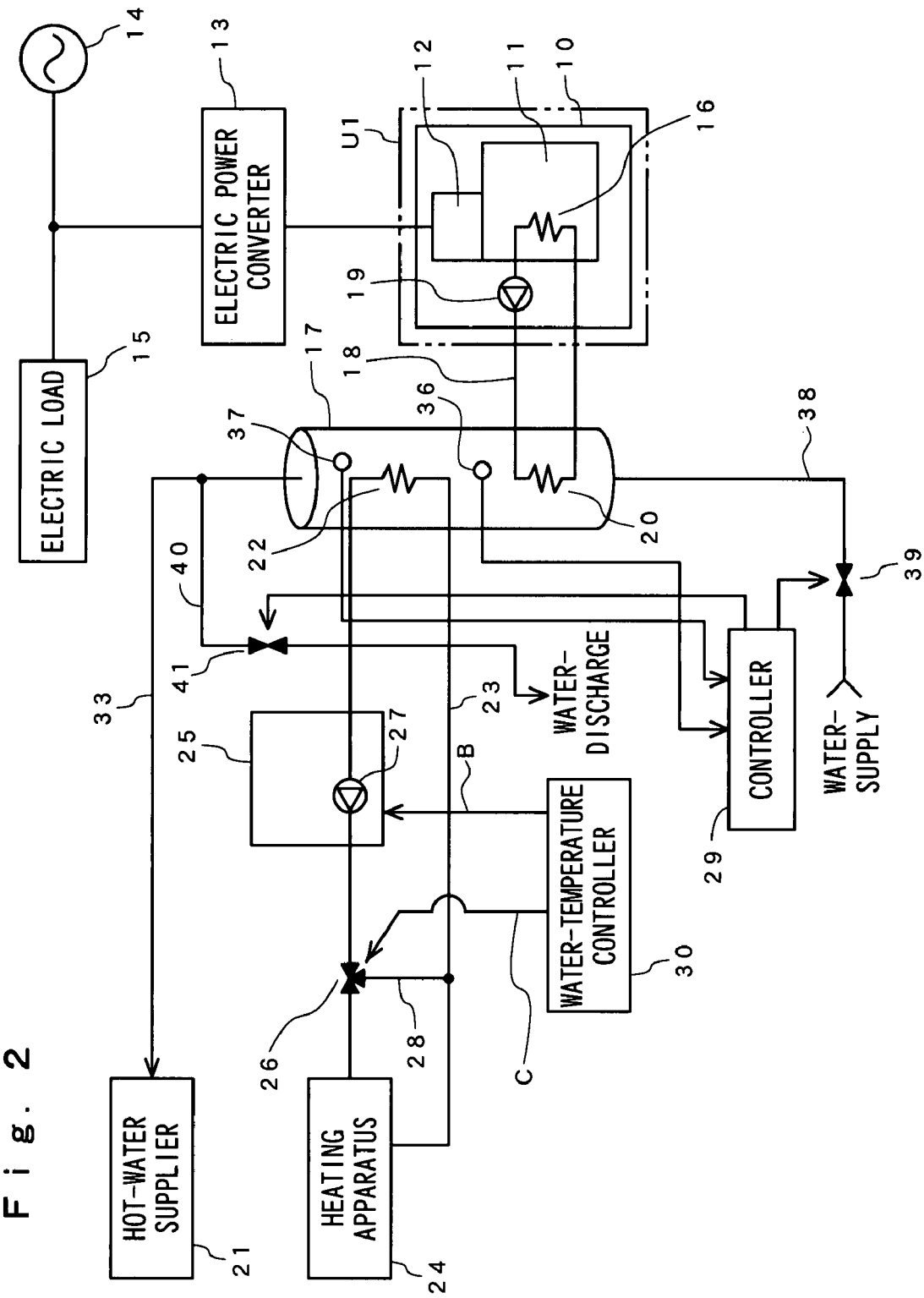
FIG. 2 is a block diagram showing a configuration of a cogeneration apparatus according to an embodiment of the present invention.

An embodiment of the present invention will be described below in detail with reference to the accompanying diagrams. FIG. 2 is a block diagram showing a configuration of a heat-demand-priority type cogeneration apparatus in which an engine-driven electric power generator is engaged with a commercial electric power system. An engine-driven electric power generator unit 10 includes an (internal-combustion) engine 11 and an electric power generator 12 which are mechanically connected to each other. The electric power generator 12 is driven by the engine 11 to generate an AC power depending on an engine speed. The engine 11 is, for example, a gas engine using city gas as a fuel.

The electric power converter 13 has a function that exchanges the AC power output from the electric power generator 12 with an AC power having the same quality (related to a voltage, a frequency, noise, and the like) as that of the commercial electric power system and synchronizes with the commercial electric power system in phase to link the electric converter 13 to the commercial electric power system. More specifically, the converter 13 has functions such as a converter which converts the AC power output from the electric power generator 12 into a DC power, an inverter which converts the DC power converted by the converter into an AC power having a frequency and a voltage matched with the commercial electric power system, a noise filter, a linkage switch, and the like. An example of a system linking electric power conversion apparatus is disclosed in Japanese Patent Application Laid-open No. 4-10302. An output AC power from the electric power generator 12 converted by the converter 13 is connected to an electric load 15 in linkage with the commercial electric power system 14. In general, a generated electric power of the electric generator 12 can singularly cope with the electric load 15. However, a large electric power is demanded to make a generated electric power obtained by the electric generator 12 short, the shortage can be compensated by an electric power from the commercial electric power system 14.

The engine 11 generates heat with an operation of the electric generator 12. The heat is collected by heat exchange performed by a water cooler 16 of the engine 11. This heat collection preferably targets all high-temperature parts such as a muffler of the engine 11. Cooling water in a pipe line 18 passing through the water cooler 16 is circulated by a pump 19. An amount of heat is carried to the hot-water tank 17 by using the cooling water as a medium. A first heat exchanger 20 connected to the pipe line 18 is disposed in the hot-water tank 17, and water supplied from a water-supply source (not shown) to the hot-water tank 17 is heated by heat from the first heat exchanger 20 to obtain hot water. The hot water stored in the hot-water tank 17 is supplied to a hot-water supplier 21 serving as a first heat load through a hot water line 33. In the hot-water tank 17, a water-temperature sensor 36 which detects a temperature of the water in the hot-water tank 17 and a water-level sensor 37 which detects an amount of water in the hot-water tank 17 are arranged.

The pump 19 is started in conjunction with an operation of the engine-driven electric power generator unit 10. On the other hand, a period of time (set by a timer) after the engine-driven electric power generator unit 10 is stopped, the pump 19 is preferably designed to be stopped. The pump 19 may be started when the temperature on the engine 11 side is higher than that on the hot-water tank 17. When an atmospheric temperature is low, the pump 19 may be started prior to the start of the engine-driven electric power generator unit 10 to heat the engine 11 with the hot water in the hot-water tank 17.

A water-supply pipe 38 is provided between a water supply source (not shown) and the hot-water tank 17, and a water-supply valve 39 is provided in the water-supply pipe 38. The water-supply valve 39 is opened when the amount of water in the hot-water tank 17 is equal to or smaller than a reference value to make it possible to supply hot water.

The hot water line 33 branches to a water-discharge pipe 40. On the way of the water-discharge pipe 40, a water-discharge valve 41 is provided. The water-discharge valve 41 is opened to discharge water in normal maintenance, and is also opened to discharge water as a special measure to forcibly cause heat demand.

A second heat exchanger 22 is arranged above the first heat exchanger 20. A second hot-water path 23 which is independent of the hot water line 33 is connected to the second heat exchanger 22. A heating apparatus 24 serving as a second heat load such as a central heating system or a floor heating system is arranged on the second hot-water path 23. Hot water output from the second heat exchanger 22 returns to the second heat exchanger 22 in the hot-water tank 17 through the heating apparatus 24 to form a circulating path. By the second hot-water path 23, heat can be secondarily collected from the hot-water tank 17.

The second heat exchanger 22 is arranged above the first heat exchanger 20 because high-temperature water which receives an amount of heat from the first heat exchanger 20 moves above the first heat exchanger 20 by convection. The second heat exchanger 22 is arranged above the first heat exchanger 20 to make it possible to extract a large amount of heat from the high-temperature water moving upward by convection.

An addition heater or boiler 25 and a three-way valve 26 are arranged on the second hot-water path 23. In the addition heater 25, a pump 27 to circulate hot water in the second hot-water path 23 is arranged. A three-way valve 26 serving as a switching means which switches the second hot-water path 23 to a pipe line 28 side to bypass hot water to stop the supply of the hot water to the heating apparatus 24 is arranged.

The controller 29 performs start and stop control of the engine 11 depending on heat demand. More specifically, the controller 29 drives the engine 11 to generate an amount of heat when a water temperature T detected by the water-temperature sensor 36 is equal to or less than a set temperature T1 which is set in advance.

When an amount of heat obtained by a continuous operation of the engine-driven electric power generator unit 10 exceeds a heat consumption or when the system is started, the temperature of water in the hot-water tank 17 decreases, and the temperature of supplied water may be a temperature which cannot cope with heat demand. When the temperature of the hot water in the hot-water tank 17 cannot be maintained at a reference temperature by only collected heat from the engine-driven electric power generator unit 10, the addition heater 25 is operated by a water-temperature controller 30. The water-temperature controller 30 outputs an addition heating command B to the addition heater 25 when the water temperature T detected by the water-temperature sensor 36 is equal to or less than the water temperature T2 (T1>T2), and outputs a switching command C to the three-way valve 26. When the switching command C is ON, the three-way valve 26 is switched such that hot water flows into the pipe line 28.

Figure 1:
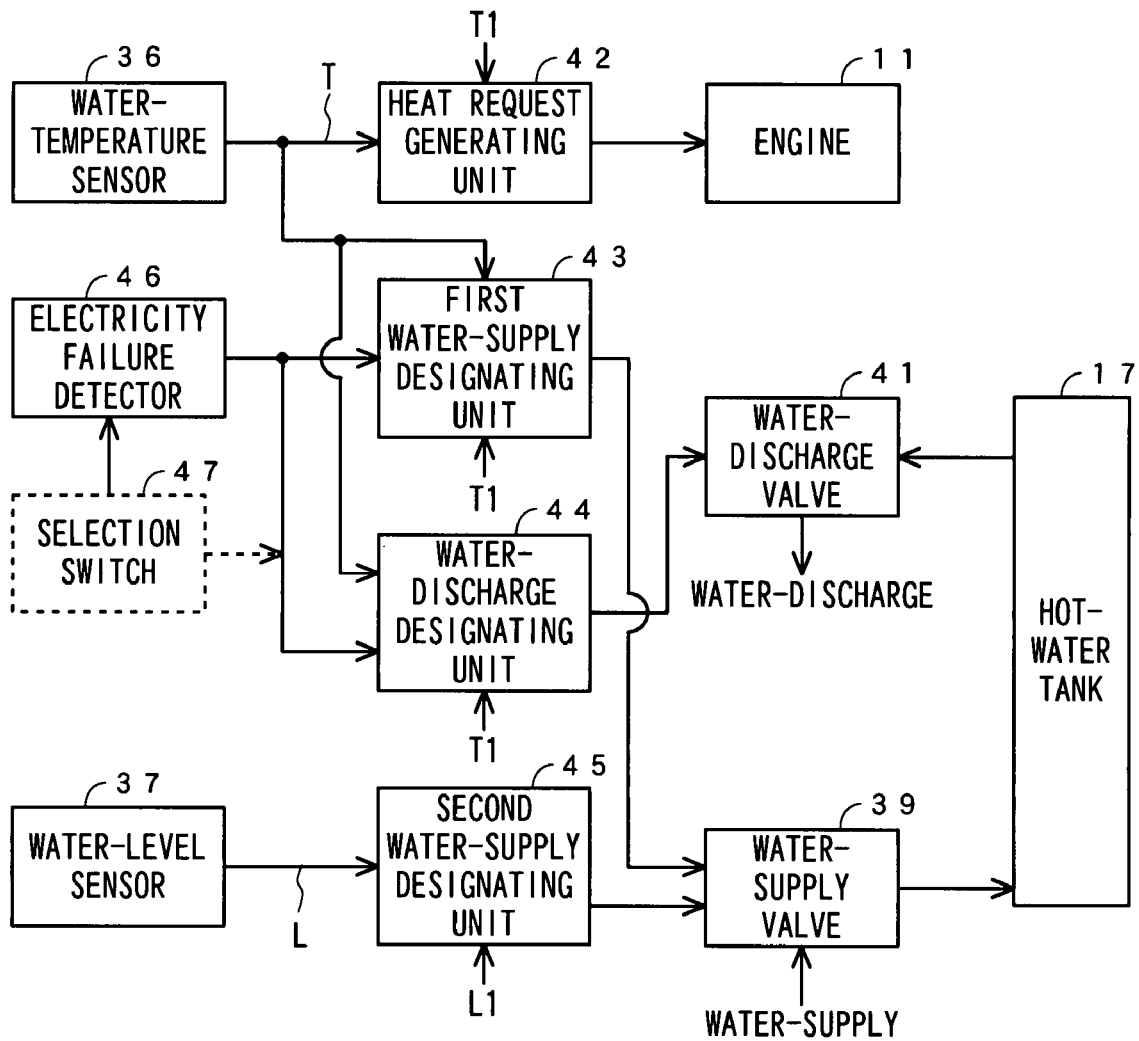
FIG. 1 is a block diagram showing main-part functions of a cogeneration apparatus according to an embodiment of the present invention.

In this embodiment, in an emergency such as electricity failure, heat demand is forcibly generated as a special measure to cope with electric power demand even though there is no heat demand so as to make it possible to operate the engine-driven electric power generator unit 10. The function of the controller 29 which makes it possible to operate the engine-driven electric power generator unit 10 even though there is not heat demand will be described below. In FIG. 1, a heat request generating unit 42 output a heat request signal when the water temperature T is equal to or less than the temperature T1, that is to say, there is heat demand. When there is no heat demand, heat demand is forcibly generated to generate a heat request signal from the heat request generating unit 42. According to the heat request signal output from the heat request generating unit 42, the engine 11 is driven.

A generating means for forcibly generating heat demand can be constituted as follows. The heat request generating unit 42 does not output a heat request signal until the water temperature T is equal to or less than the set temperature T1. Therefore, in order to cause heat demand, the water temperature T is decreased to a temperature which is equal to or less than the set temperature T1. For example, a first water-supply designating unit 43 can be provided. The first water-supply designating unit 43 performs control such that a water-supply command is inputted to the water-supply valve 39 to open the water-supply valve 39 when the water temperature T is equal to or more than the predetermined temperature T1. When the water-supply valve 39 is opened, cold water is externally supplied to the hot-water tank 17 to decrease the water temperature T. When the water temperature T decreases to the temperature which is equal to or less than the set water temperature T1, the heat request generating unit 42 recognizes that heat demand is formed by an input water temperature to output a heat request signal, thereby starting the engine 11.

Heat demand can be generated as follows. For example, a water-discharge designating unit 44 can be provided. The water-discharge designating unit 44 performs control such that a water-discharge command is inputted to the water-discharge valve 41 when the water temperature T is equal to or higher than the predetermined temperature T1 to open the water-discharge valve 41. When the water-discharge valve 41 is opened, hot water in the hot-water tank 17 is discharged outside the hot-water tank 17 to decrease a water level L. A second water-supply designating unit 45 sets the water level L in the hot-water tank 17 and inputs a water-supply command to the water-supply valve 39 to open the water-supply valve 39 when the water level L is equal to or less than the water level L1. When the water-supply valve 39 is opened to supply water into the hot-water tank 17, thereby decreasing the water temperature T. In this manner, heat demand is generated, and the heat request generating unit 41 outputs a heat request signal to start the engine 11.

According to the above described function, heat demand is forcibly generated on the basis of the water temperature and the water level in the hot-water tank to make it possible to automatically singularly operate the apparatus. For this reason, a heat-demand-priority type cogeneration apparatus which is suitable for an electric load such as a refrigerator or a computer to which a power must be continuously supplied can be provided.

It is assumed that the function that forcibly generates heat demand is necessary to cover electric power demand in an emergency such as electricity failure in the system. Therefore, only when a electricity failure detector 46 is arranged to cause the electricity failure detector 46 to detect electricity failure, the first water-supply designating unit 43 or the second water-supply designating unit 45 can be operated.

The function that forcibly generates heat demand may be a selectable function. For example, independently of a normal operation mode, a selection switch 47 which forcibly generates heat demand to make it possible to select an independent operation mode coping with electric power demand is provided. When the selection switch 47 is switched to the independent operation mode, the first water-supply designating unit 43 or the water-discharge designating unit 44 is designed to be operated.

As the electricity failure detector 46, an well-known electricity failure detector can be used. For example, electric failure can be determined by the presence/absence of a phase skip of the commercial electric power system 14. In electricity failure or abnormality of the commercial electric power system 14, a linkage switch is controlled to disconnect the engine-driven electric power generator unit 10 from the system 14. In relation to detection of electricity failure, detection of abnormality, and disconnection from the commercial electric power system, for example, a technique described in Japanese Patent Application Laid-open No. 2002-70606 can be used.

Figure 3:
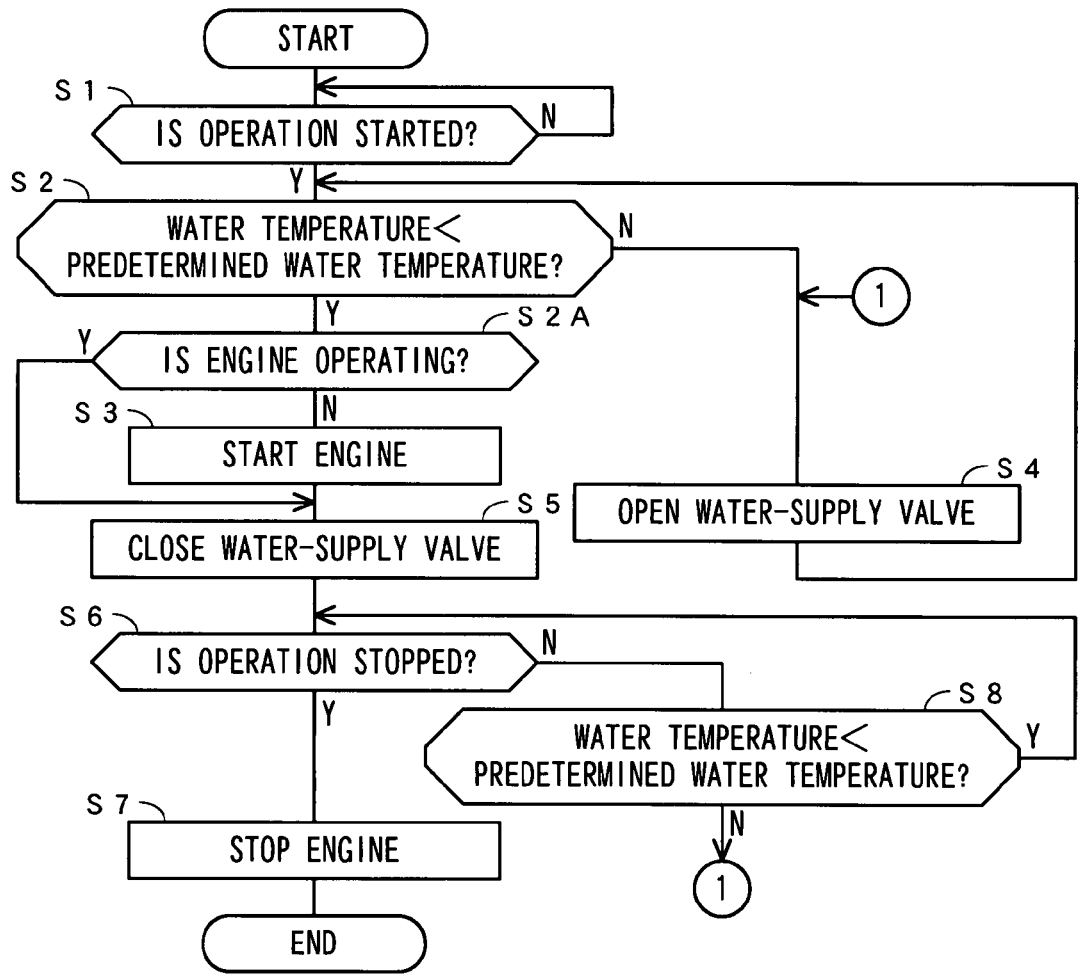
FIG. 3 is a flow chart showing an operation in a single mode.

FIG. 3 is a flow chart showing an example of a main operation of the controller 29. In FIG. 3, in step S1, it is determined whether an operation start designation of the engine-driven electric power generator unit 10 is given. When the operation start designation is given, the controller 29 shifts to step S2 to determine whether the water temperature T is equal to or less than the predetermined water temperature T1 or not. When the water temperature T is equal to or less than the predetermined water temperature T1, the controller 29 shifts to step S2A to determine whether the engine is operating. When the engine is operating, the controller 29 shifts to step S5. When the engine is not operating (stopped), the controller 29 shifts to step S3 to start the engine 11. On the other hand, when the water temperature T is not equal to or less than the predetermined water temperature T1, the controller 29 shifts to step S4 to open the water-supply valve 39 and to supply water into the hot-water tank 17. Once the water-supply valve 39 is opened, the controller 29 shifts to step S2. When the water temperature T is equal to or lower than the predetermined water temperature T1 by the water supply, determination in step S2 become affirmative, and the engine 11 is started in step S3. More specifically, in the engine-driven electric power generator unit 10, the engine 11 can be started regardless of the water temperature T when the operation start designation is given.

In step S5, a command for opening the water-supply valve 39 is turned off. By this OFF command, the opened water-supply valve 39 is closed, and the closed water-supply valve 39 is maintained in a closed state. In step S6, the presence/absence of an operation stop designation is determined. When the operation stop designation is inputted, the controller 29 shifts to step S7 to give the stop designation to the engine 11 to stop the engine 11. When the operation stop designation is not inputted, the controller 29 shifts to step S8 to determine whether the water temperature T is equal to or less than the predetermined water temperature T1 or not. When the water temperature T is not equal to or less than the predetermined water temperature T1, the controller 29 shifts to step S4.

Figure 4:
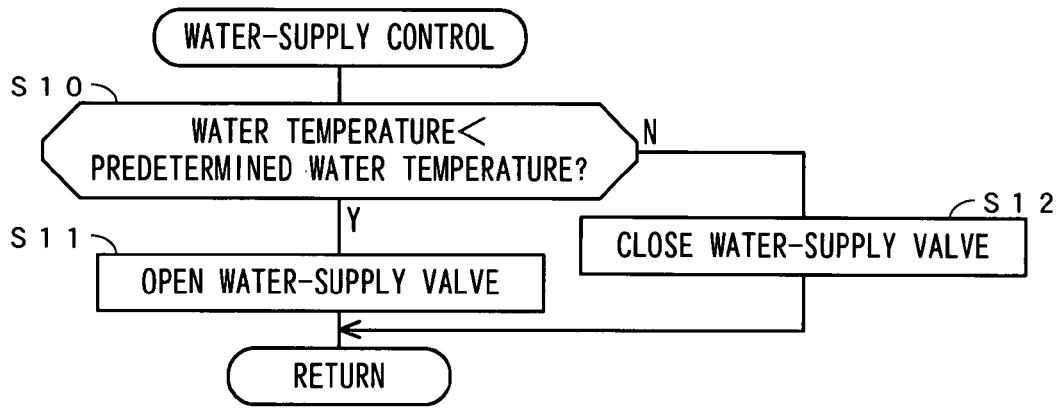
FIG. 4 is a flow chart of water level control.
Figure 5:
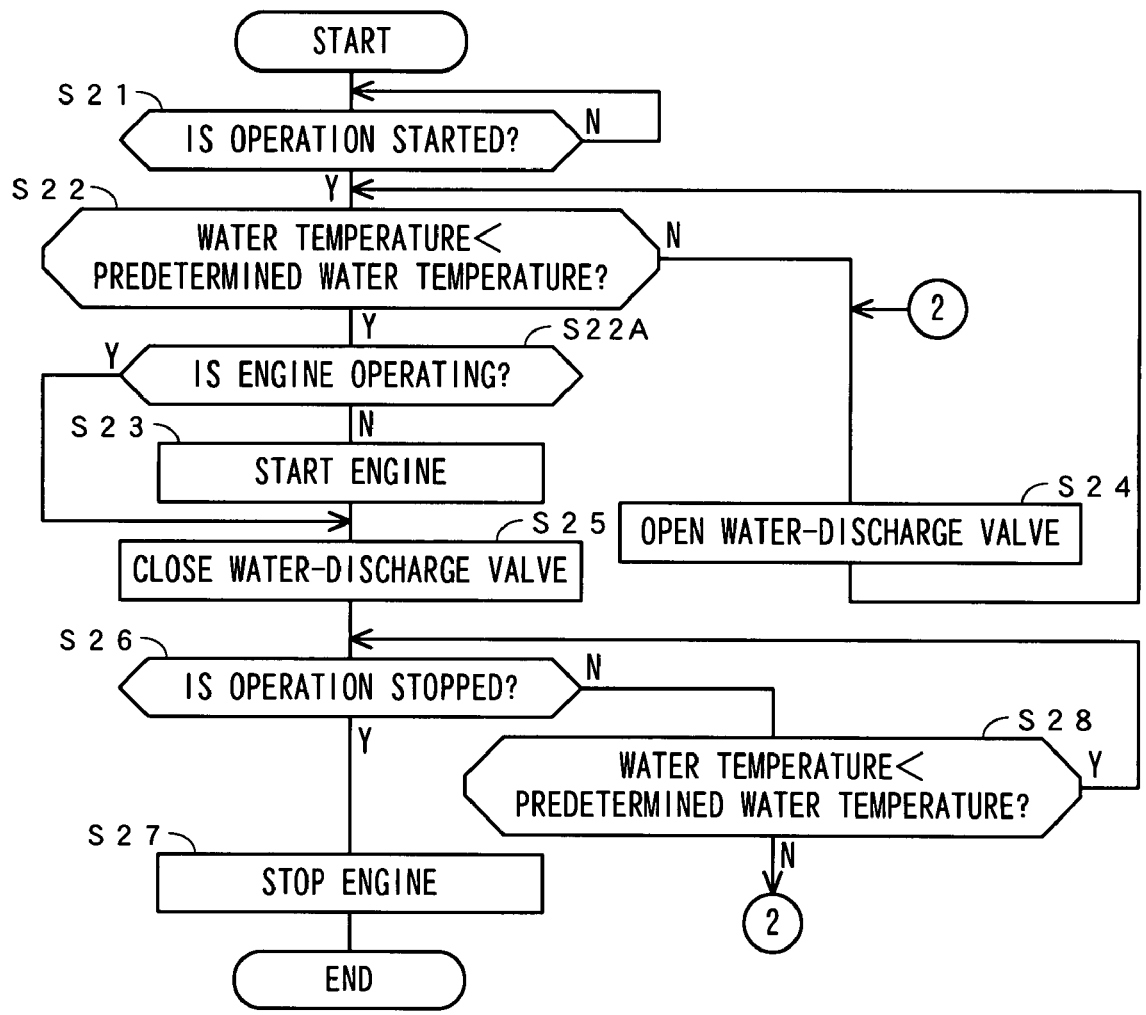
FIG. 5 is a flow chart showing an operation example including a water level control.

FIGS. 4 and 5 are flow charts showing another example of a main operation of the controller 29. FIG. 4 is a flow chart related to water-supply control to the hot-water tank 17. When the set water level L in the hot-water tank 17 is equal to or less than the water level L1 in step S10, the controller 29 shifts to step S11 to turn on a command to open the water-supply valve 39. On the other hand, when the water level L in the hot-water tank 17 is not equal to or less than the set water level L1, the controller 29 shifts to step S12 to turn off a command to open the water-supply valve 39. In this manner, the water-supply valve 39 is controlled such that the set water level of the hot-water tank 17 is maintained.

In addition to the process in FIG. 4, the process in FIG. 5 is performed to make the water temperature T in the hot-water tank 17 equal to the predetermined water temperature T1, and heat demand is forcibly generated to make it possible to operate the engine-driven electric power generator unit 10.

In FIG. 5, in step S21, it is determined whether an operation start designation for the engine-driven electric power generator unit 10 is given. When the operation start designation is given, the controller 29 shifts to step S22 to determine whether the water temperature T is equal to or less than the predetermined water temperature T1. When the water temperature T is equal to or less than the predetermined water temperature T1, the controller 29 shifts to step S22A to determine whether the engine is operating. When the engine is operating, the controller 29 shifts to step S25. When the engine is not operating (stopped), the controller 29 shifts to step S23 to start the engine 11.

On the other hand, the water temperature T is equal to or less than the predetermined water temperature T1, the controller 29 shifts to step S24 to open the water-discharge valve 41 and to discharge water from the hot-water tank 17. Once the water-discharge valve 41 is opened, the controller 29 shifts to step S22. When the water level L decreases to a level which is equal to or less than the water level L1 by discharging water, the water-supply valve 39 is opened by the processes in FIG. 4.

With this water supply, when the water temperature T is equal to or less than the predetermined water temperature T1, determination in step S22 become affirmative, and the engine 11 is started in step S23. More specifically, in the engine-driven electric power generator unit 10, when the operation start designation is given, the engine 11 can be operated regardless of the water temperature T.

In step S25, the command to open the water-discharge valve 41 is turned off. By this OFF command, the opened water-discharge valve 41 is closed, and the closed water-discharge valve 41 is maintained in a closed state. In step S26, the presence/absence of an operation stop designation is determined. When the operation stop designation is inputted, the controller 29 shifts to step S27 to give the stop designation to the engine 11 to stop the engine 11. When the operation stop designation is not inputted, the controller 29 shifts to step S28 to determine whether the water temperature T is equal to or less than the predetermined water temperature T1 or not. When the water temperature T is not equal to or less than the predetermined water temperature T1, the controller 29 shifts to step S24.

The water-level maintaining control shown in FIG. 4 is normally used in hot-water supply equipment to resupply an amount of used water. A water-discharge valve is also generally arranged in equipment such as the hot-water tank 17. Therefore, in this embodiment, existing equipment is controlled, heat demand is caused when there is no heat demand to make it possible to operate the engine-driven electric power generator unit 10. For example, in electricity failure in the commercial electric power system 14, the electric power generator 12 is disconnected from the system 14, and a special measure which causes the electricity failure detector 46 to detect electricity failure to forcibly cause heat demand is performed. For this reason, the apparatus can cope with necessary electric power demand.

The invention claimed is:

1. A heat-demand-priority type cogeneration apparatus, comprising:
    an engine;
    an electric power generator driven by said engine;
    a heat exchanger collecting exhaust heat from said engine;
    a hot water tank receiving heat from said heat exchanger;
    a water temperature sensor detecting water temperature in said hot water tank;
    a controller which turns on said engine only when the water temperature detected by said water temperature sensor is less than a predetermined temperature; and
    a water supply valve, controlled by said controller, which supplies water into said hot water tank,
    wherein when the water temperature detected by said water temperature sensor is greater than or equal to the predetermined temperature, said controller causes water to flow from said water supply valve into said hot water tank.

2. A heat-demand-priority type cogeneration apparatus, comprising:
    an engine;
    an electric power generator driven by said engine;
    a heat exchanger collecting exhaust heat from said engine;
    a hot water tank receiving heat from said heat exchanger;
    a water temperature sensor detecting water temperature in said hot water tank;
    a controller which turns on said engine only when the water temperature detected by said water temperature sensor is less than a predetermined temperature;
    a water level sensor in the hot water tank;
    a water supply valve, controlled by said controller, which supplies water into said hot water tank when the water level is less than or equal to a predetermined level; and a discharge valve, controlled by said controller, which discharges water from said water tank, wherein when the water temperature detected by said water temperature sensor is greater than or equal to the predetermined temperature, said controller causes water to flow from said hot water tank from said discharge valve, until the water level detected by said water level sensor is less than or equal to a predetermined level.

3. The cogeneration apparatus of claim 1 or 2, further comprising:

a power connection bridging an output from said electric power generator with an external electric power source; and an electric failure detector which detects an electricity failure in said external electric power source, wherein said controller lowers the water temperature in said water tank below said predetermined temperature when an electricity failure in said external electric power source is detected by said electric failure detector.

4. The cogeneration apparatus of claim 3, wherein said power connection includes a switch which disconnects said external electric power source from the output of said electric power generator, when said electric failure detector detects an electricity failure in said external power source.

* * * * *